US007535567B2

(12) United States Patent
Rebinsky

(10) Patent No.: US 7,535,567 B2
(45) Date of Patent: May 19, 2009

(54) NOZZLE SORTING APPARATUS AND METHOD

(75) Inventor: Douglas A. Rebinsky, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 338 days.

(21) Appl. No.: 11/504,519

(22) Filed: Aug. 15, 2006

(65) Prior Publication Data

US 2008/0041768 A1 Feb. 21, 2008

(51) Int. Cl.
*G01B 9/08* (2006.01)

(52) U.S. Cl. .................................... 356/391; 356/241.1

(58) Field of Classification Search ................. 356/391, 356/241.1

See application file for complete search history.

(56) References Cited

U.S. PATENT DOCUMENTS 5,000,043 A 3/1991 Bunch, Jr. et al.
6,053,037 A * 4/2000 Kojima et al. ............ 73/114.46

* cited by examiner

*Primary Examiner*—Roy Punnoose
(74) *Attorney, Agent, or Firm*—Liell & McNeil

(57) ABSTRACT

A sorting apparatus includes a nozzle, a light source, and a light receiver. The nozzle is positioned with respect to the light source and the light receiver such that light from the light source travels through holes defined by the nozzle and onto the light receiver, thereby to create a light pattern. The light pattern may be analyzed to sort the nozzle into one of several categories. A corresponding method is also provided.

20 Claims, 3 Drawing Sheets

NOZZLE SORTING APPARATUS AND METHOD

TECHNICAL FIELD

This disclosure relates to sorting nozzles and other similar components, and more particularly to sorting by projecting electromagnetic radiation through holes defined by the nozzle or other component to create a light pattern that can be detected on a light receiver.

BACKGROUND

A fuel injector for a compression ignition engine includes a nozzle defining a plurality of holes through which fuel is injected into a combustion chamber at high pressure. The holes are typically microscopic, often less than 300 micrometers in diameter. Accordingly, even if the holes are visible, ascertaining the quantity of holes, the angular orientation of the holes, and the sizes of the holes is difficult, if not impossible, to perform visually, especially in high-volume commercial operations such as nozzle manufacturing or remanufacturing.

However, it is desirable to sort nozzles based on their hole configurations. For example, during nozzle manufacturing, it is desirable to ensure that the holes are properly formed prior to installation in an engine, and therefore it is desirable to sort newly manufactured nozzles based on whether the holes are within design specification.

Remanufacturing involves obtaining used nozzles (and other engine components) and reconditioning them for further use. Accordingly, it is desirable to test used nozzles to determine whether the holes are still within design specification and whether any holes have become blocked during use, and to sort the nozzles accordingly. Furthermore, the configuration of the holes, such as the quantity of holes, the angular orientation of the holes, and the size of the holes, determines characteristics of the spray pattern of the fuel as it is injected into a combustion chamber, and therefore the configuration of the holes affects engine performance. Some hole configurations are optimal for certain engines and applications, and are not acceptable for other engines and applications. Accordingly, it is desirable to sort nozzles based on the configuration of the holes. In some circumstances, nozzles having different hole configurations are otherwise identical to one another in all other respects only the configuration of the holes differentiates them.

It is also desirable to sort nozzles during engine servicing. For example, testing the efficacy of a nozzle and its holes may determine whether a blocked nozzle hole is the cause of a perceived engine operating problem.

Testing the efficacy and spray pattern of a fuel injector nozzle is presently performed by passing a liquid through the holes of the nozzle and visually observing the spray pattern. For example, Bunch, Jr. et al. describe, in U.S. Pat. No. 5,000,043, an apparatus and method for spraying fuel from a nozzle and observing the subsequent spray pattern. Kojima et al. describe, in U.S. Pat. No. 6,053,037, an apparatus in which liquid is sprayed from the nozzle being tested into a saucer having a plurality of partitions. Sensors measure the head pressure in each of the partitions to determine the amount of the liquid collected therein. Other known testing includes a determination of mass flow rate out of the injector at a predetermined injection pressure.

Prior art fuel injector nozzle testing apparatuses and methods thus require fuel or other liquid to be passed through the holes of a nozzle, which requires a hydraulic circuit to provide the fuel or other liquid to the nozzle. The hydraulic circuit adds cost and mechanical complexity to the testing apparatus, and a substantial amount of time is required to perform the test of each nozzle. Moreover, the method of passing liquid through the holes of a nozzle is not sufficiently refined to enable an observer to differentiate the nozzles being tested on the basis of many variations from nozzle to nozzle.

The present disclosure is directed to one or more of the problems set forth above.

SUMMARY OF THE DISCLOSURE

An apparatus for sorting nozzles includes a light source configured to emit light, a light receiver, and a nozzle defining a plurality of holes. The light may be visible or invisible, and may include at least one of visible light, laser light, infrared, ultraviolet, x-rays, etc. The nozzle is sufficiently positioned with respect to the light source and the light receiver such that light from the light source travels through the plurality of holes and onto the light receiver thereby to create a light pattern on the light receiver.

A method of sorting nozzles includes projecting light through a plurality of holes in a nozzle to produce a light pattern. The method also includes sorting the nozzle into one of a plurality of predetermined categories based on the light pattern.

DETAILED DESCRIPTION

Several exemplary embodiments and descriptions of sorting will be set forth below. These are exemplary only and intended to convey general principles to those of ordinary skill in the art. These embodiments and descriptions are not intended to limit or define the scope of patent protection. The scope of patent protection is intended to be defined in the attached set of claims.

The disclosure will be primarily described with reference to its application of sorting fuel injector tips. However, the disclosure is equally applicable to sorting other similar components or any component that may benefit therefrom.

Figure 1A:
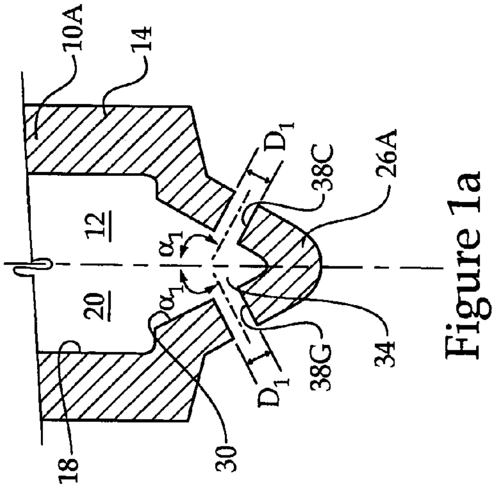
FIG. 1*a* is a schematic, partial cross sectional view of a first fuel injector nozzle defining a plurality of fuel injection holes.
Figure 1B:
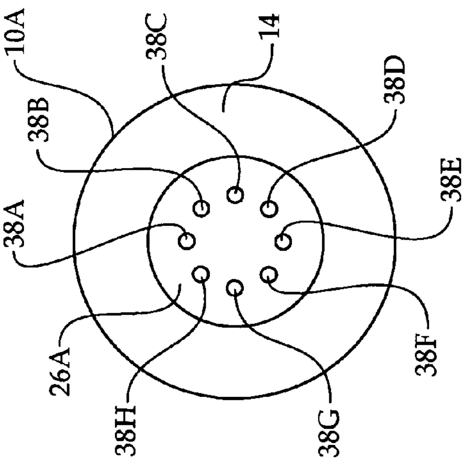
FIG. 1*b* is a schematic, bottom view of the first fuel injector nozzle of FIG. 1*a;*

Referring to FIGS. 1*a* and 1*b*, a first fuel injector nozzle 10A for a compression-ignition engine defines a fuel chamber 12. The first fuel injector nozzle 10A is characterized by a generally cylindrical portion 14 having an inner surface 18 that defines a cylindrical portion 20 of the fuel chamber 12. The first fuel injector nozzle 10A is also characterized by a generally conical tip 26A having an inner surface 30. The inner surface 30 defines a generally conical portion 34 of the fuel chamber 12, which is often referred to as the sac, and may have a different shape, such as hemispherical.

The tip 26A of the first fuel injector nozzle 10A defines a plurality of fuel injection holes 38A-H. The holes 38A-H extend from the conical portion 34 of the chamber 12 to the exterior of the fuel injector nozzle 10A. As understood by those of ordinary skill in this art, fuel under high pressure flows from the fuel chamber 12 into a combustion chamber (not shown) through the holes 38A-H during a fuel injection event.

The nozzle 10A is characterized by a first hole configuration. The first hole configuration includes eight holes. Each of the holes 38A-H is cylindrical, and is characterized by a diameter $D_1$. Each of the holes 38A-H is characterized by an angular orientation; the centerline of each hole 38A-H forms angle $\alpha_1$ with the centerline C of the nozzle 10A. The first configuration is also characterized by the positions of the holes 38A-H, relative to the nozzle 10A and to each other, as shown in FIGS. 1*a* and 1*b*.

Figure 2A:
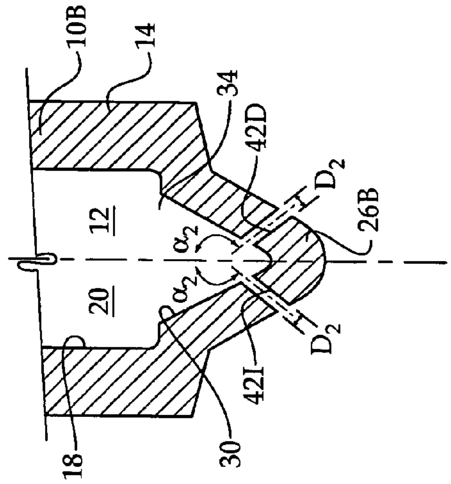
FIG. 2*a* is a schematic, partial cross sectional view of a second fuel injector nozzle defining a plurality of fuel injection holes.
Figure 2B:
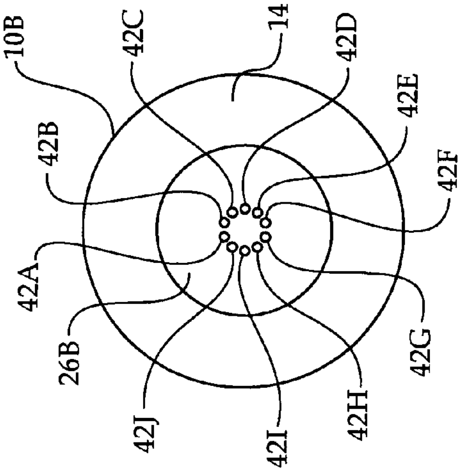
FIG. 2*b* is a schematic, bottom view of the second fuel injector nozzle of FIG. 2*a;*

Referring to FIGS. 2*a* and 2*b*, a second fuel injector nozzle 10B is schematically depicted. The second fuel injector nozzle 10B may be identical to the first fuel injector nozzle 10A (e.g., the first and second nozzles 10A, 10B may have originated from identical blanks), except that nozzle 10B is characterized by a second hole configuration different from the first hole configuration. More specifically, the tip 26B of the nozzle 10B defines ten cylindrical holes 42A-J, and thus the second hole configuration differs from the first hole configuration in hole quantity. Each of the holes 42A-J is cylindrical in shape, and has a diameter $D_2$ smaller than diameter $D_1$ of the holes 38A-H of nozzle 10A; thus, the second hole configuration differs from the first hole configuration in hole size. The centerline of each of holes 42A-J forms angle $\alpha_2$ with the centerline C of the nozzle 10B. Angle $\alpha_2$ is greater than angle $\alpha_1$, and thus the second hole configuration differs from the first hole configuration in the angular orientation of holes. Holes 42A-J are closer to one another than holes 38A-H, and the distance between holes 42A-J and the lowermost extent of nozzle 10B is less than the distance between holes 38A-H and the lowermost extent of nozzle 10A. Thus, the second hole configuration differs from the first hole configuration in the positions of the holes.

Those skilled in the art will recognize that the holes 38A-H and 42A-J of FIGS. 1*a*, 1*b*, 2*a*, and 2*b* are shown greatly exaggerated in size. The holes 38A-H and 42A-J are less than 300 microns in diameter, and thus have a flow area of less than about 0.07 square millimeters. Accordingly, the holes 38A-H and 42A-J are difficult, if not impossible, to visually inspect. Even if the holes 38A-H and 42A-J are visible, it is difficult, if not impossible, to visually perceive the differences in configuration such as hole quantity, hole size, hole angular orientation, and hole position between nozzle 10A and nozzle 10B.

The first and second hole configurations of nozzles 10A, 10B are exemplary. Hole configurations may include holes of any shape (e.g., oval, bugle shaped, etc.), size, orientation, quantity, position, etc. Further, although the holes of each nozzle 10A, 10B are shown identical in shape, size, and angular orientation, etc., it should be noted that a single nozzle may define holes of varying sizes, shapes, orientation, etc. One such example might be a showerhead nozzle used in some homogeneous charge compression ignition engines with holes of various orientations with respect to the nozzle centerline.

Figure 3B:
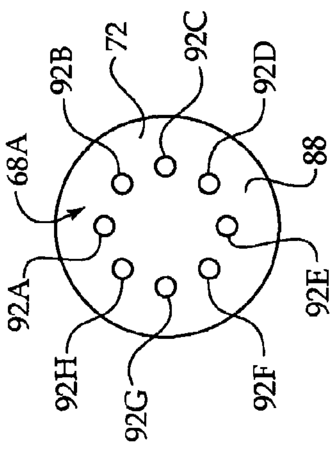
FIG. 3*b* is a schematic, elevational view of the screen of FIG. 3*a* as viewed from light receiver 76.
Figure 3C:
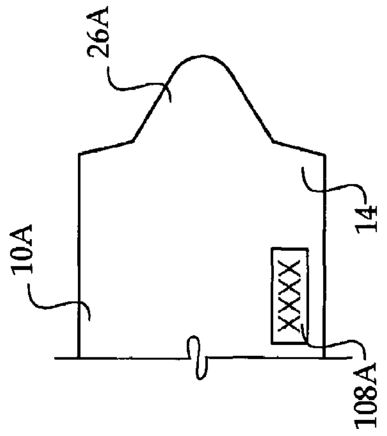
FIG. 3*c* is a schematic, partial elevational view of the first fuel injector nozzle including a first identifier thereon.
Figure 3A:
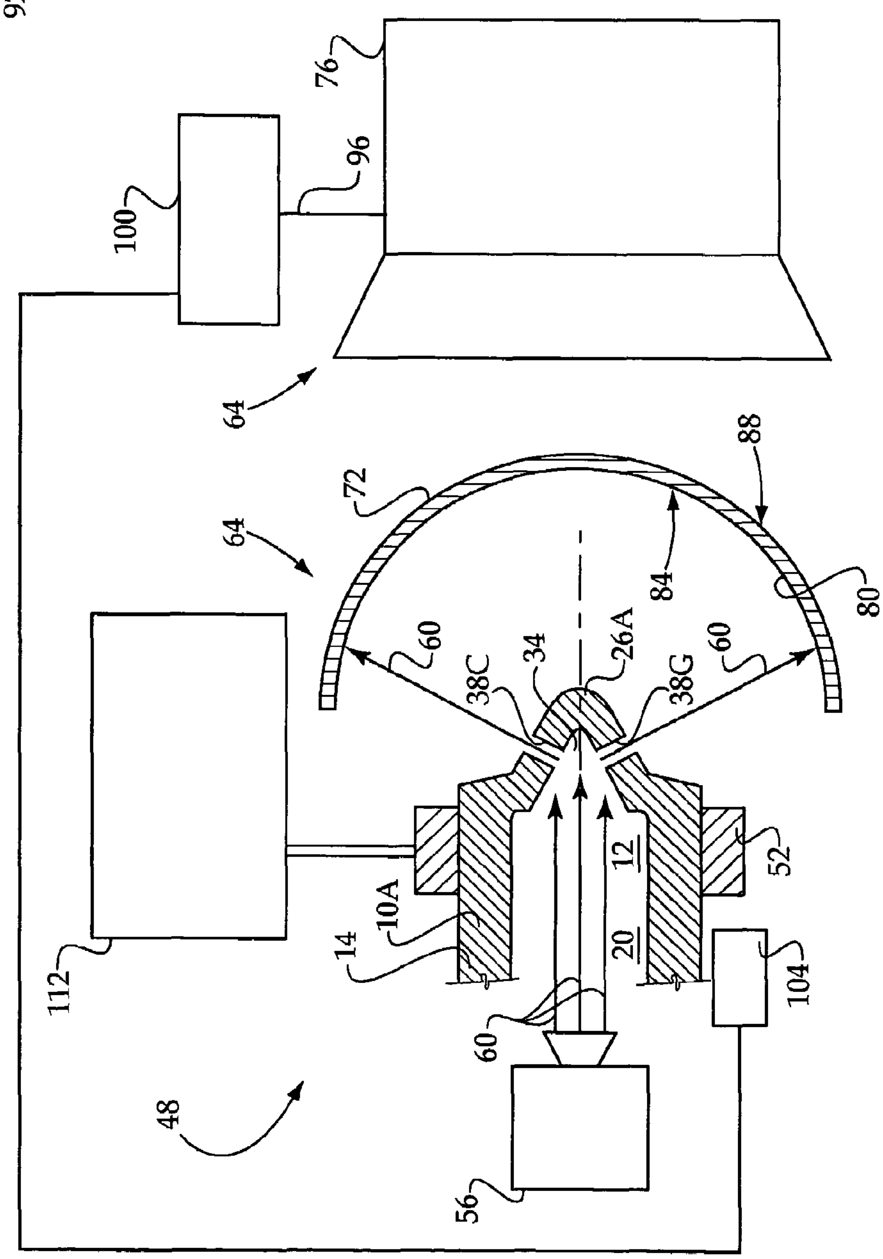
FIG. 3*a* is a schematic depiction of a sorting apparatus with the first fuel injector nozzle of FIG. 1*a* mounted therein.

Referring to FIG. 3*a*, an apparatus 48 for sorting nozzles is schematically depicted. The apparatus 48 includes a fixture 52 configured to retain a nozzle, which is nozzle 10A in FIG. 3*a*. A light source 56 is configured to emit light 60. Those of ordinary skill in the art will be able to identify a variety of different light sources that may be employed within the scope of the present disclosure. For example, the light source may be an incandescent bulb, a fluorescent bulb, a light-emitting diode, a laser, etc. The light 60 may be in the visible or invisible part of the spectrum. Thus, "light" in the context of the present disclosure means any electromagnetic radiation, which may include white light, laser infrared, ultraviolet, x-rays, etc.

The nozzle 10A is positioned within the fixture 52 such that light 60 from the light source 56 travels through the fuel chamber 12 and the holes 38A-H, and onto a light receiver 64, thereby to create a first light pattern (shown at 68A in FIG. 3*b*). It may be desirable for a fiber optic cable (not shown) or the like to extend at least partially into the fuel chamber 12 to concentrate light 60 from the light source 56 inside the nozzle 10A.

The light receiver 64 includes at least one of a screen 72 and a light sensor 76, such as a digital camera. In the embodiment depicted, the light receiver 64 includes both a screen 72 and a light sensor 76. Although the use of a screen 72 is optional, it is beneficial because a screen of a particular shape may intersect light 60 from the nozzle at close to a right angle so that the light is not distributed across a large surface area. The screen may have any geometric shape, such as hemispherical, cylindrical, planar, or any combination of shapes. The shape may be chosen to maximize sensitivity of sorting. For example, the screen 72 may define a concavity 80 that is open in the direction of the nozzle 10A, and, in the embodiment depicted, the screen 72 is hemispherical. In the embodiment depicted, the screen 72 is translucent, but not transparent, so that the light 60 diffuses as it passes through the screen 72, thereby making the light pattern more detectable by the light sensor 76. Light 60 from the holes 38A-H enters the screen 72 at a first surface 84 that defines the concavity 80, and exits the screen 72 from a second surface 88 that is opposite the first surface. The light sensor 76 is positioned to detect light 60 emitted from the second surface 88.

A "light pattern" is formed on a light receiver by the interaction of light from the nozzle 10A and the light receiver 64. Characteristics of a light pattern include the angle of incidence; the angle of refraction (if the light receiver is opaque or reflective); the manner in which light diffuses through the light receiver (if the light receiver is translucent); the area of illumination (i.e., the area of the light receiver receiving light), the intensity of the illumination (i.e., the electromagnetic flux at the surface of the light receiver); the distribution of light intensity over the surface of the light receiver; etc. As used herein, a light "pattern" does not imply any particular type or style of arrangement, configuration, or distribution of light on a light receiver, just light that can be detected in some way.

Referring to FIG. 3*b*, the light pattern 68A on the screen 72 has a plurality of regions 92A-H of locally intense illumination. Each of regions 92A-H is illuminated by light 60 emitted from a respective one of the holes 38A-H, and thus, each of the regions 92A-H corresponds to a respective one of the holes 38A-H. Referring again to FIG. 3*a*, the light sensor 76 is configured to generate sensor signals 96 indicative of the light pattern 68A.

A controller, i.e., a processor, 100 is operatively connected to the light sensor 76 to receive signals 96. In the context of the present disclosure, a "controller" or "processor" is any device or set of devices that are operative to perform the logical operations disclosed herein. A controller may be mechanical, electronic, etc. A typical electronic controller typically includes a microprocessor, ROM and RAM and appropriate input and output circuits of a known type for receiving various input signals and for outputting various control commands. An electronic controller may be programmable via software or have circuits physically dedicated to performing the logical operations described herein.

The controller 100 is programmed to process the signals 96 to sort the nozzle 10A into a first of a plurality of predetermined categories based on the light pattern 68A. For example, the controller 100 may sort one type of nozzle having holes in certain configuration from other types of nozzles having holes in other configurations. Or, the controller 100 may sort nozzles of the same type according to whether any of the holes are clogged, worn, damaged, etc. Or, the controller 100 may perform any combination of these types of sorting or other types of sorting. The controller 100 is operatively connected to a marker device 104 to cause the marker device 104 to mark the nozzle 10A with an identifier (shown at 108A in FIG. 3*c*) that corresponds to the first of the predetermined categories into which the nozzle 10A has been sorted. Those of ordinary skill in this art will be able to identify and select from a variety of marking devices 104 that may be appropriate for a given application, such as laser etchers, mechanical etchers, ink printers, adhesive labels, etc.

The apparatus 48 may include an automatic feeder mechanism 112 that is configured to remove the nozzle 10A from the fixture 52, and to load another nozzle into the fixture for sorting. Referring to FIG. 4*a*, the apparatus 48 is depicted with nozzle 10A removed from the fixture 52, and with nozzle 10B retained in the fixture 52 for sorting.

Figure 4B:
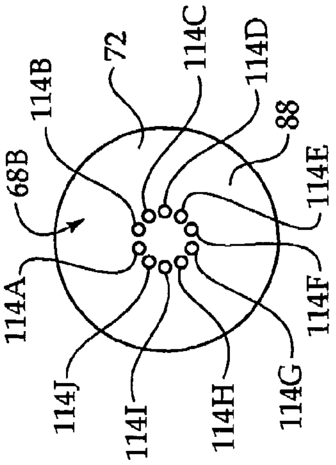
FIG. 4*b* is a schematic, elevational view of the screen of FIGS. 3*a* and 4*a*.

In the fixture 52, the nozzle 10B is situated such that light 60 from the light source 56 travels through the fuel chamber 12, the holes 42A-J, and onto the screen 72 thereby to create a second light pattern (as shown at 68B in FIG. 4*b*). Since the hole configuration of nozzle 10B is different from the hole configuration of nozzle 10A, the second light pattern 68B is different from light pattern 68A.

Figure 4C:
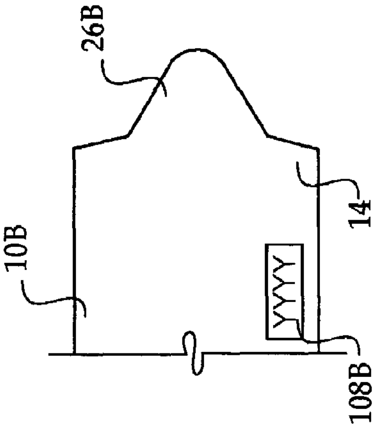
FIG. 4*c* is a schematic, elevational view of the second fuel injector nozzle including a second identifier thereon.
Figure 4A:
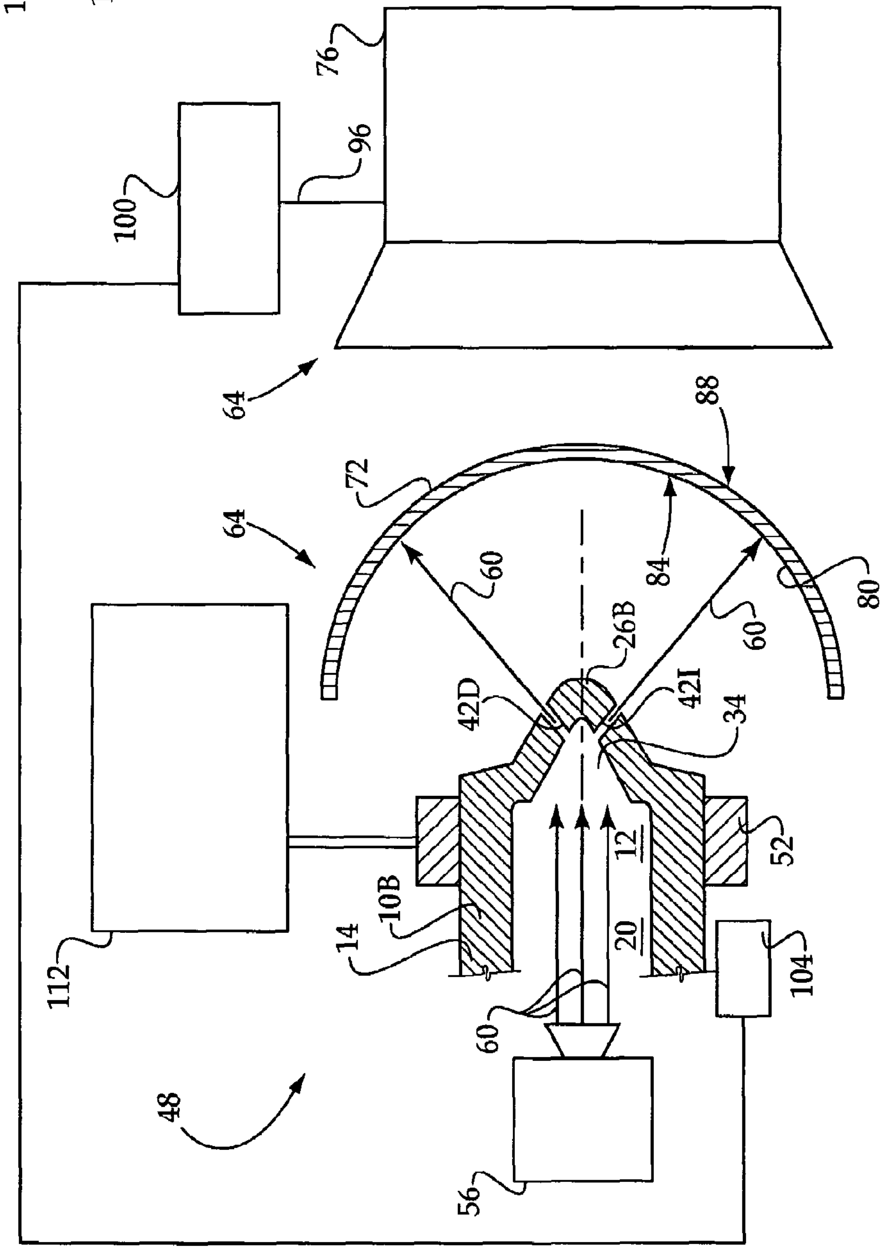
FIG. 4*a* is a schematic depiction of the apparatus of FIG. 3*a* including the second fuel injector nozzle of FIG. 2*a;*

More particularly, and with reference to FIGS. 4*a* and 4*b*, the second light pattern 68B has a plurality of regions 114A-J of locally intense illumination shown on the second side 88 of the screen 72. The light sensor 76 is positioned to detect the light pattern 68B and to transmit sensor signals 96 to the controller 100, which is programmed to sort nozzle 10B into a second of the plurality of predetermined categories. The controller 100 causes the marker device 104 to mark the nozzle 10B with a second identifier (shown at 108B in FIG. 4*c*) that corresponds to the second of the plurality of predetermined categories.

It may be desirable for the fixture 52, and therefore the nozzle contained therein, to be selectively rotatable via an actuator (not shown). The actuator may be controllable by the controller in order to selectively rotate the nozzle contained in the fixture and thereby arrange the light pattern on the screen for facilitated processing by the controller 100.

It may also be desirable for the screen 72 to be selectively movable such that the distance between the screen 72 and the nozzle 10A is selectively variable. As light departs the nozzle holes, it diffuses; accordingly, the size of the light pattern (and its component regions of locally intense illumination) on the screen 72 increases with increasing distance from the nozzle 10A. This increase in size is beneficial because it provides an enlarged projection of the hole configuration, facilitating both manual and automated hole configuration inspection. However, as the light diffuses, the light pattern generated becomes less distinct. Accordingly, the ability to vary the distance between the nozzle and the screen enables the controller or an operator to tune the apparatus to provide the optimum setting of light pattern size and light pattern distinctness.

It may also be desirable for the light sensor 76 to be selectively movable so that the distance between the screen 72 and the light sensor 76 is selectively variable in order to compensate for any movement of the screen so that the screen as perceived by the light sensor may remain constant.

In a preferred embodiment, the apparatus 48, including the light source 56, the fixture 52, the screen 72, and the light sensor 76, is contained inside a light-proof housing (not shown) to prevent ambient light from interacting with the screen 72 or the light sensor 76 and obscuring the light pattern formed by light from the nozzle. The interior surfaces of the container are configured to absorb light having the same wavelength of light from the light source to prevent stray light from the light source from obscuring the light pattern formed by light from the nozzle.

INDUSTRIAL APPLICABILITY

The sorting apparatus 48 may be advantageously used to sort nozzles without injecting fluid through the nozzles. Accordingly, the sorting apparatus 48 is simpler than prior art sorting systems because it does require a hydraulic circuit having a pump, a reservoir, etc. The sorting apparatus 48 also improves upon the prior art because passing light through a nozzle requires less time than injecting fuel or other liquid through the nozzle, thereby reducing the time required to sort a nozzle, and thus improving productivity. Furthermore, the apparatus 48 provides an enlarged image that corresponds to each unblocked nozzle hole, enabling more accurate and detailed sorting than is possible with merely visually observing fluid from the holes of a nozzle. The apparatus 48 also facilitates automated sorting of nozzles, because the enlarged images generated are more readily converted to digital or other electronic signals for processing by a controller than fluid sprayed from a nozzle.

The controller 100 may determine into which of the plurality of categories a nozzle is sorted based on one or more light pattern characteristics, which may include (1) the quantity of regions of locally intense illumination that are present in a light pattern, which corresponds to the quantity of unblocked holes in a nozzle; (2) the sizes of the regions of locally intense illumination that are present in a light pattern, which is determined, at least in part, by the sizes of the unblocked holes in a nozzle and their angles of orientation; (3) the intensity of illumination of the regions of locally intense illumination (or the total pattern), which is determined, at least in part, by sizes and angular orientations of the unblocked holes in a nozzle; (4) the relative positions of the regions of locally intense illumination, which corresponds to the relative positions of the unblocked holes of a nozzle; etc.

In order to program the controller for optimum sorting, it may be desirable to obtain and examine multiple characteristics of the light patterns produced by a sample of nozzles to be sorted, and to determine those characteristics that best differentiate nozzles in different categories. The controller 100 is preferably programmed to process the sensor signals 96 into one of the predetermined categories based on fewer than all of the light pattern characteristics obtained and examined, i.e., those characteristics that best differentiate the nozzles.

It should be noted that, in some circumstances, nozzles with different hole configurations may be functionally equivalent, and therefore should be sorted into the same category. In such a situation, it may be desirable for the controller to sort based on aggregated characteristics, such as the total or average light intensity of the screen, the combined surface area of the regions of locally intense illumination, etc.

Thus, the controller may sort by quantifying or qualifying characteristics of a light pattern, as perceived by the light sensor. It may be desirable to use commercially available machine vision software for analysis of light patterns. Those skilled in the art will recognize a variety of machine vision software that may be employed, such as "Vision Builder for Automated Inspection" available from National Instruments. Those skilled in the art will recognize a variety of other techniques that may be employed to sort a nozzle based on its light pattern. For example, the controller 100 may sort a nozzle by comparing the light pattern generated to one or more stored light patterns, each corresponding to a predetermined category, and sorting the nozzle based on which of the stored light patterns is most similar to, or substantially identical to, the generated light pattern.

In a first exemplary application of the sorting apparatus, nozzles are sorted after their manufacture to determine if they are within design specification, and the predetermined categories into which the nozzles are sorted will include a first category for nozzles that are within design specification, and a second category for nozzles that are not within design specification.

In a second exemplary application of the sorting apparatus, nozzles are sorted during remanufacturing to determine which of several hole configurations each nozzle has. The predetermined categories may include part numbers, an engine application for which the nozzle is suited, etc. The predetermined categories may also include a category for nozzles that are no longer serviceable, due to blocked holes, etc.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims. For example, the screen 72, if present, may be opaque, and the light sensor 76 positioned on the same side of the screen 72 as the nozzle 10A, 10B to detect the light pattern on the screen. The light receiver 64 may not include a light sensor 76, and the light pattern may be analyzed manually by a human. The light receiver may not include a screen 72, and the light sensor 76 may receive light 60 from the nozzle holes directly. The light sensor 76 may be positioned inside the fuel chamber 12, and the light source 62 may be positioned to transmit light into the chamber 12 through the holes 38A-H, 42A-J. The screen may be of any shape, including flat and cylindrical. Other nozzles, besides those used in fuel injection, may also be employed.

I claim:

1. An apparatus for sorting nozzles comprising:
- a light source configured to emit light;
- a light receiver; and
- a nozzle defining a plurality of holes and positioned with respect to the light source and the light receiver such that light from the light source travels through said plurality of holes and onto the light receiver thereby to create a light pattern on the light receiver.

2. The apparatus of claim 1, wherein the light receiver includes a screen.

3. The apparatus of claim 2, wherein the screen is translucent.

4. The apparatus of claim 2, wherein the screen is concave.

5. The apparatus of claim 4, wherein the screen defines a portion of a sphere.

6. The apparatus of claim 1, wherein the light receiver includes a light sensor configured to generate signals indicative of the light pattern.

7. The apparatus of claim 6, further comprising a processor operatively connected to the light sensor to receive the signals, and programmed to process the signals to sort the nozzle into one of a plurality of predetermined categories.

8. The apparatus of claim 7, further comprising a marker operatively connected to the processor and configured to mark the nozzle with an identifier corresponding to said one of a plurality of predetermined categories.

9. The apparatus of claim 1, further comprising a fixture retaining the nozzle with respect to the light source and the light receiver; and a feeder mechanism configured to remove the nozzle from the fixture and load another nozzle into the fixture.

10. The apparatus of claim 1, wherein the plurality of holes are fuel injector holes.

11. The apparatus of claim 10, wherein each of said plurality of holes is characterized by a flow area of less than about 0.07 square millimeters.

12. A method of sorting nozzles comprising:
- projecting light through a plurality of holes in a nozzle to produce a light pattern; and
- sorting the nozzle into one of a plurality of predetermined categories based on the light pattern.

13. The method of claim 12, wherein said projecting light through a plurality of holes in a nozzle to produce a light pattern includes producing the light pattern on a light receiver; said light pattern having a plurality of regions of locally intense illumination on the light receiver, each of said regions of locally intense illumination corresponding to a respective one of said plurality of holes.

14. The method of claim 13, wherein said sorting is based on the quantity of regions of locally intense illumination.

15. The method of claim 13, wherein said sorting is based on the sizes of the regions of locally intense illumination.

16. The method of claim 13, wherein said sorting is based on at least one of the relative positions and intensity of the regions of locally intense illumination.

17. The method of claim 13, wherein said sorting includes comparing the light pattern to at least one stored light pattern.

18. The method of claim 13, further comprising identifying a plurality of light pattern characteristics; and wherein said sorting the nozzle is based on fewer than all of said light pattern characteristics.

19. The method of claim 12, further comprising marking the nozzle with an identifier corresponding to said one of a plurality of categories after said sorting the nozzle into one of a plurality of predetermined categories.

20. A method of sorting nozzles comprising:
- projecting light through a first plurality of holes in a first nozzle and onto a screen to produce a first light pattern having a first plurality of regions of locally intense illumination on said screen, each of said first plurality of regions of locally intense illumination corresponding to a respective one of said first plurality of holes; and
- sorting the first nozzle into a first of a plurality of predetermined categories based on at least one of the sizes, the quantity, and the relative positions of the first plurality of regions of locally intense illumination;
- projecting light through a second plurality of holes in a second nozzle and onto a screen to produce a second light pattern having a second plurality of regions of locally intense illumination on said screen, each of said second plurality of regions of locally intense illumination corresponding to a respective one of said second plurality of holes; and
- sorting the second nozzle into a second of said plurality of predetermined categories based on at least one of the sizes, the quantity, and the relative positions of the second plurality of regions of locally intense illumination.

* * * * *